US009514476B2

(12) United States Patent
Kay et al.

(10) Patent No.: US 9,514,476 B2
(45) Date of Patent: Dec. 6, 2016

(54) SYSTEMS AND METHODS FOR DISCOVERING ARTISTS

(75) Inventors: Peter Kay, New York, NY (US); Mark Mezrich, New York, NY (US); Daniel Shearer, Brooklyn, NY (US); Ryan Shafer, Jackson Heights, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 310 days.

(21) Appl. No.: 13/087,145

(22) Filed: Apr. 14, 2011

(65) Prior Publication Data

US 2012/0096011 A1 Apr. 19, 2012

Related U.S. Application Data

(60) Provisional application No. 61/324,171, filed on Apr. 14, 2010.

(51) Int. Cl.
*G06Q 30/02* (2012.01)
*G06F 17/30* (2006.01)

(52) U.S. Cl.
CPC ..... *G06Q 30/0241* (2013.01); *G06F 17/30761* (2013.01); *G06F 17/30769* (2013.01); *G06Q 30/0282* (2013.01); *G06F 17/30743* (2013.01); *G06F 17/30749* (2013.01); *G06F 17/30752* (2013.01)

(58) Field of Classification Search
None
See application file for complete search history.

(56) References Cited

U.S. PATENT DOCUMENTS

| | | | |
|---|---|---|---|
| 5,801,703 A * | 9/1998 | Bowden et al. | 715/841 |
| 7,454,509 B2 * | 11/2008 | Boulter et al. | 709/231 |
| 7,672,873 B2 * | 3/2010 | Kindig et al. | 705/26.1 |
| 8,364,669 B1 * | 1/2013 | Chowdhury | G06F 17/30038 707/726 |
| 2001/0021914 A1 * | 9/2001 | Jacobi et al. | 705/8 |
| 2001/0053994 A1 * | 12/2001 | Atcheson et al. | 705/10 |
| 2002/0002899 A1 * | 1/2002 | Gjerdingen et al. | 84/667 |
| 2003/0149628 A1 * | 8/2003 | Abbosh et al. | 705/16 |
| 2003/0229537 A1 * | 12/2003 | Dunning et al. | 705/10 |
| 2003/0236695 A1 * | 12/2003 | Litwin, Jr. | 705/10 |
| 2005/0038819 A1 * | 2/2005 | Hicken et al. | 707/104.1 |
| 2005/0071122 A1 * | 3/2005 | Deeds | 702/179 |
| 2005/0249080 A1 * | 11/2005 | Foote et al. | 369/59.1 |
| 2006/0031404 A1 * | 2/2006 | Kassab | 709/218 |
| 2006/0143236 A1 * | 6/2006 | Wu | G06F 17/30053 |
| 2006/0195516 A1 * | 8/2006 | Beaupre | 709/203 |

(Continued)

*Primary Examiner* — Daniel Kinsaul
(74) *Attorney, Agent, or Firm* — Fay Kaplun & Marcin, LLP (57) ABSTRACT

A musician discovery system is provided. The musician discovery system includes a first interface for displaying a plurality of musicians organized according to a musical characteristic. The system includes a second interface for presenting multimedia information about a first musician from the plurality of musicians displayed on the first interface. The system includes means for comparing a second plurality of musicians with the first musician using the multimedia information presented on the second interface about the first musician. Furthermore, the system includes a third interface for recommending a second musician from the second plurality of musicians based on the comparing means.

22 Claims, 10 Drawing Sheets

(56) References Cited

U.S. PATENT DOCUMENTS

| | | | |
|---|---|---|---|
| 2006/0265421 A1* | 11/2006 | Ranasinghe | G06F 17/30743 |
| 2006/0271972 A1* | 11/2006 | Pai et al. | 725/86 |
| 2007/0244856 A1* | 10/2007 | Plastina et al. | 707/3 |
| 2008/0016205 A1* | 1/2008 | Svendsen | G06F 17/30017 |
| | | | 709/224 |
| 2008/0052371 A1* | 2/2008 | Partovi et al. | 709/217 |
| 2008/0263476 A1* | 10/2008 | Vignoli | G06F 17/30026 |
| | | | 715/810 |
| 2009/0271283 A1* | 10/2009 | Fosnacht et al. | 705/26 |
| 2009/0282029 A1* | 11/2009 | Koenigstein et al. | 707/5 |
| 2010/0125351 A1* | 5/2010 | Davydov | 700/94 |
| 2010/0175031 A1* | 7/2010 | Alton et al. | 715/841 |
| 2010/0205222 A1* | 8/2010 | Gajdos et al. | 707/803 |
| 2012/0064870 A1* | 3/2012 | Chen et al. | 455/414.3 |

\* cited by examiner

SYSTEMS AND METHODS FOR DISCOVERING ARTISTS

CROSS REFERENCE TO RELATED APPLICATIONS

This application claims the benefit of and priority to U.S. Provisional Application Ser. No. 61/324,171 filed Apr. 14, 2010, the disclosure of which is incorporated herein by reference in its entirety.

FIELD OF THE INVENTION

The technology generally relates to systems and methods for exploring music and discovering artists. An artist can be understood as a musician within the context of the present invention.

BACKGROUND OF THE INVENTION

Conventional metrics for gauging the popularity of an artist include CD sales and radio plays. However, these metrics are less useful for discovering new, up-and-coming artists. This is because conventional metrics do not take into account of other platforms used by fans today to explore music, such as, for example, social media networks or video streaming websites.

Hence, systems and methods are needed to provide comprehensive, real-time tracking and analysis of up-and-coming artists. In addition, a discovery tool is needed for finding new artists and new music.

SUMMARY OF THE INVENTION

The invention, in various embodiments, features systems and methods for exploring music and discovering artists.

In one aspect, a musician discovery system is provided. The system includes a first interface for displaying multiple musicians organized according to a musical characteristic. The system also includes a second interface for presenting multimedia information about a first musician from the musicians displayed on the first interface. The system additionally includes means for comparing a second set of musicians with the first musician using the multimedia information presented on the second interface about the first musician. The system further includes a third interface for recommending a second musician from the second set of musicians based on the comparing means.

In another aspect, a computer-assisted method for discovering musicians is provided. The method includes selecting multiple musicians from a library database based on information supplied by a user via a computer interface. The method includes organizing the musicians according to at least one musical characteristic. The method also includes permitting the user to select a first musician from the multiple musicians and presenting multimedia information about the first musician to the user collected from a plurality of media sources in electrical communication with the library database. The method further includes comparing a second set of musicians from the library database with the first musician to determine their similarity or dissimilarity with the first musician and recommending a second musician from the second set of musicians to the user based on the comparing.

In other examples, any of the aspects above can include one or more of the following features. In some embodiments, the multiple musicians can be selected based on an input by a user. The input can be a musician name or a musical genre.

In some embodiments, the multiple musicians are ranked by the first interface according to the musical characteristic. The musical characteristic can be a popularity score and the first interface ranks the plurality of musicians according to their corresponding popularity scores. The popularity score can be weighted according to a genre type associated with each musician. In some embodiments, one or more musicians are selected for display from the multiple musicians if their popularity scores are above a threshold. In some embodiments, one or more musicians are selected for display from the multiple musicians if their popularity scores are below a first threshold and above a second threshold.

In some embodiments, a similarity score is assigned to each of the second set of musicians and the similarity scores are compared to a threshold. In some embodiments, the similarity score associated with the second musician selected from the second set of musicians can be higher than the threshold. In some embodiments, the similarity score associated with the second musician selected from the second set of musicians is lower than the threshold.

In some embodiments, the multimedia information about the first musician includes at least one of biography, song, photo, blog, video or tweet associated with the first musician. In some embodiments, the musician discovery system further includes a library database for storing the multimedia information corresponding to the multiple musicians. The library database can be in electrical communication with at least one of a music database, a website, a photo database, a search engine and a video database.

In some embodiments, the third interface recommends the second musician based on a feature of musical similarity or dissimilarity between the first and second musicians. In some embodiments, the third interface is further adapted to display a third set of musicians from the library database who share a feature of musical similarity or dissimilarity with the first musician. The third interface can also rank the third set of musicians according to their degrees of similarity of dissimilarity with the first musician.

In some embodiments, the musician discovery system further includes a fourth interface for providing advertisement related to the plurality of musicians.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION OF THE INVENTION

Figure 1:
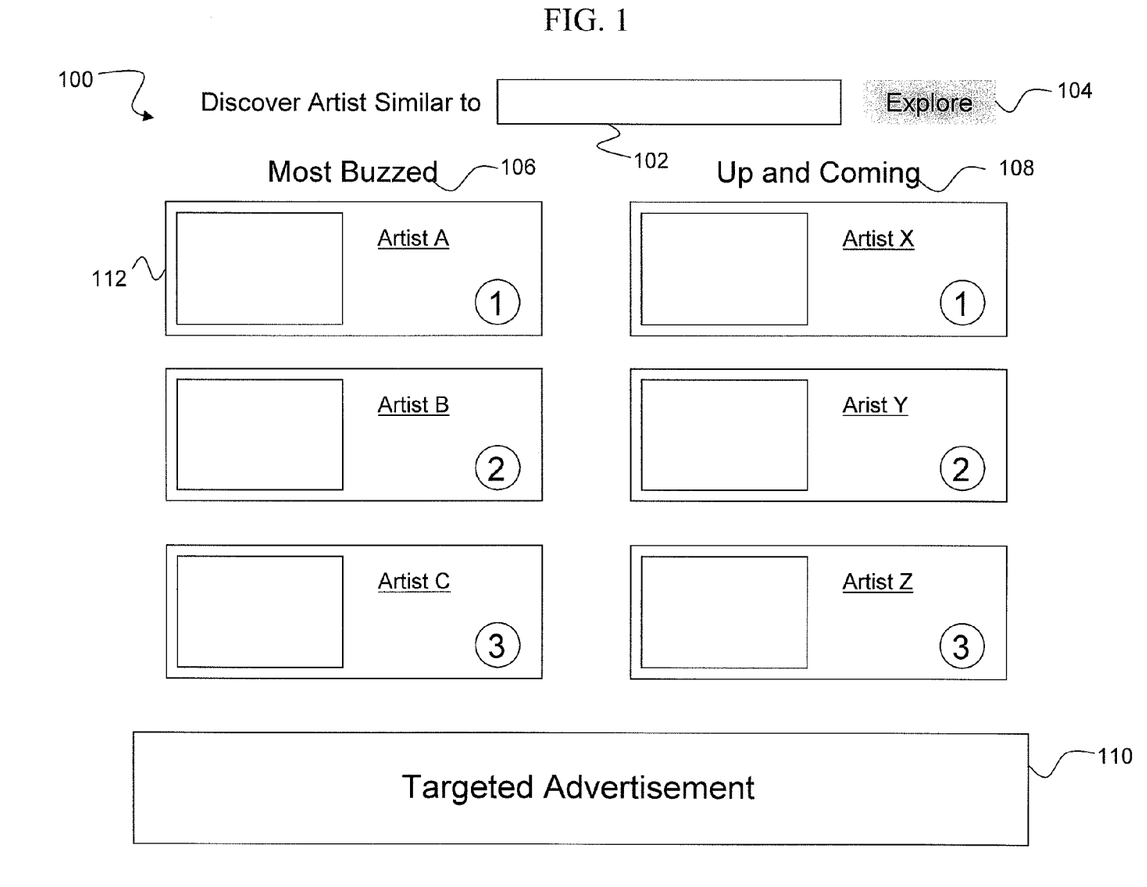
FIG. 1 shows a diagram of an exemplary artist discovery interface.

FIG. 1 shows an exemplary online artist discovery interface 100 according to one embodiment of the technology. As illustrated, interface 100 includes input field 102 through which a user can supply text-based inputs to the interface. A user can enter the inputs in free form via field 102 or select them from a drop down menu associated with field 102. Interface 100 is also configured to present a list of "most buzzed" artists 106 and a list of "up and coming" artists 108. In addition, interface 100 comprises an advertisement region 110 for targeted advertising.

In one embodiment, "most buzzed" list 106 is configured to provide a list of artists who are familiar to music listeners. Interface 100 generates "most buzzed" list 106 by searching for artists in one or more libraries in communication with interface 100 and assigning a familiarity score to each of the artists found. Interface 100 can compute an artist's familiarity score using systems and methods described in application Ser. Nos. 12/101,013 and 12/100,966, incorporated herein by reference. Known methods for computing an artist's familiarity score include determining the number of reviews and posts published about the artist in a given time period, tracking media attention received by the artist on social media websites and measuring the artist's media presence through online sales, radio plays and online media references.

In certain embodiments, the libraries can be located on a web server in electronic communication with a user device from which interface 100 is displayed. The libraries can store metadata, web content, musical tracks, videos and photos associated with a plurality of artists. In certain embodiments, the web server may include search engines providing efficient searches of the libraries by artist names, track titles or album titles, for example. In certain embodiments, the web server includes processing modules to control the operation of interface 100. Further details regarding network environment of the present technology is discussed below with reference to FIG. 4.

Interface 100 is adapted to populate "most buzzed" list 106 with only those artists whose familiarity scores are above a threshold. The threshold can be predetermined or dynamically selected and/or adjusted based on the number of results generated from the search. For instance, if too few "most buzzed" artists are identified based on the threshold, interface 100 is adapted to lower the threshold until a sufficient number of artists are found for display via "most buzzed" list 106. In addition, interface 100 can order artists on "most buzzed" list 106 according to their familiarity scores. For example, an artist who is more familiar to listeners can be ranked higher on the lists than a less familiar artist.

In another embodiment, "most buzzed" list 106 is configured to provide a list of artists who are popular with music listeners. To generate such a list, interface 100 is adapted to compute a popularity score for each artist found from one or more libraries in communication with interface 100. A popularity score can be computed by weighting the artist's familiarity score by a factor that accounts for the popularity of the artist. In certain embodiments, each familiarity score is weighted according to the artist's music sales figures or survey information about the artist. For example, the more revenue an artist generates based on his or her music, the higher the artist's popularity score is. In certain embodiments, each familiarity score is weighted according to a music genre type associated with the artist. For example, artists who are associated with a hip-pop genre are given a greater weight for ranking purposes than artists who are associated with a classical genre. In certain embodiments, each familiarity score is weighted according to the popularity of the artist among a certain listener demographic. For instance, those artists who are more popular with the 16 to 25 year-old listener demographic are assigned a greater weight than those who are less popular with the same demographic. Listener statistics such as age can be collected on an opt-in basis when, for instance, a listener accesses his or her personal account with the artist discovery system of the present technology. In certain embodiments, each familiarity score is weighted according to the reliability of the sources from which information about the popularity of the artist is collected. In certain embodiments, each familiarity score is weighted according to one or more music-related statistics collected within a specified time frame, such as the number of times an artist's videos had been played, the number of times an artist's name had been searched via interface 100 or any other search engines, the total air time associated with an artist, and the number of show appearances by an artist. In certain embodiments, each familiarity score is weighted according to certain tour-related statistics such as ticket sales generated from an artist's tour, the number of people who attended an artist's tour, and the number of cities on an artist's tour. In some embodiments the tour status, i.e., whether an artist is on tour, is used to weigh a familiarity score.

Interface 100 is adapted to display via "most buzzed" list 106 only those artists whose popularity scores are above a certain threshold. The threshold can be predetermined or dynamically selected and/or adjusted based on the number of results generated from the search.

In another embodiment, "most buzzed" list 106 is configured to provide a list of artists who are popular with listeners and who share similar musical qualities as those embodied by one or more terms supplied by a user to interface 100. A user can supply information to interface 100 via any client terminals that are configured to display interface 100. Exemplary client terminals are described below with reference to FIG. 4.

In operation, upon the user entering information via field 102 and clicking "explore" button 104 to submit the information, interface 100 is adapted to search for artists in one or more libraries in communication with interface 100 and assign a similarity score to each of the artists identified. Each similarity score reflects the degree of musical similarity between the artist and the input information. Exemplary inputs to search field 102 include one or more artist names, music track titles, music genres or a combination thereof. As one example, if a user enters the names of two artists in field 102, the similarity score computed for a third artist reflects how musically similar the third artist is to both of the named artists. As another example, if a user enters the name of a first artist in conjunction with an album title associated with a second artist, the similarity score for a third artist reflects how musically similar the third artist is to the named artist and the named album. A similarity score and can be computed based on similarities in musical genre, tempo, rhythm, beats, melody, pitch, harmony, or timbre, for example. A similarity score can be computed based on the frequency two artists are mentioned together in media outlets such as blogs, news articles, tweets, etc. A similarity score can also be computed using the systems and methods described in application Ser. Nos. 12/101,013 and 12/100,966 incorporated herein by reference. Interface 100 is also adapted to compute a popularity score for each of the artists identified using any one of the popularity score determination means described above. Interface 100 is further adapted to populate "most buzzed" list 106 with only those artists whose similarity scores are above a first threshold and whose popularity scores are above a second threshold.

According to yet another embodiment, "most buzzed" list 106 is configured to provide a list of popular artists who possess musical qualities dissimilar to those embodied by one or more user-supplied inputs via field 102. In one example, interface 100 populates "most buzzed" list 106 with only those artists whose similarity scores are below a first threshold and whose popularity scores are above a second threshold. In another example, interface 100 assigns a dissimilarity score to each of the artists searched and populates "most buzzed" list 106 with only those artists whose dissimilarity scores are above a first threshold and whose popularity scores are above a second threshold. An artist's dissimilarity score reflects the degree of dissimilarity between the artist and the user-supplied information. A dissimilarity score and can be computed based on differences in musical genre, tempo, rhythm, beats, melody, pitch, harmony, or timbre, for example. A dissimilarity score can also be computed using the systems and methods described in application Ser. Nos. 12/101,013 and 12/100,966.

According to another aspect of the technology, interface 100 is configured to display "up and coming" list 108. In one embodiment, "up and coming" list 108 presents a list of artists who are currently not familiar to music listeners but are rising in familiarity. Interface 100 generates such "up and coming" list 108 by searching for artists in one or more libraries in communication with interface 100 and assigning a familiarity score to each artist identified. Interface 100 is adapted to populate "up and coming" list 108 with only those artists whose familiarity scores are below a first threshold but above a second threshold.

In another embodiment, "up and coming" list 108 is configured to display a list of artists who are currently not popular with music listeners but are rising in popularity. Interface 100 generates such "up and coming" list 108 by computing a popularity score for each of the artists identified from one or more libraries coupled to interface 100. The popularity score of an artist can be determined by weighting the artist's familiarity score using any of the weighting methods described above. Interface 100 is adapted to populate "up and coming" list 108 with only those artists whose popularity scores are below a first threshold but above a second threshold.

In another embodiment, "up and coming" list 108 is configured to provide a list of up and coming artists who have similar musical qualities as those embodied by one or more input terms. To generate such a list, interface 100 assigns a similarity score to each of the artists identified from one or more libraries in communication with interface 100. Interface 100 is also adapted to compute a popularity score for each of the artists. "Up and coming" list 106 presents only those artists whose similarity scores are above a first threshold and whose popularity scores are below a second threshold but above a third threshold.

In yet another embodiment, "up and coming" list 108 is configured to provide a list of up and coming artists who possess musical qualities dissimilar to those captured by one or more input terms. In one example, "up and coming" list 108 is configured to present those artists who have similarity scores below a first threshold and popularity scores below a second threshold but above a third threshold. In another example, "up and coming" list 108 is configured to present those artists who have dissimilarity scores above a first threshold and popularity scores below a second threshold but above a third threshold.

In some embodiments, artists who appear on each of "most buzzed" list 106 and "up and coming" list 108 can be additionally grouped by musical genres such as, for example, Indies, Metal, Country, etc. In some embodiments, "most buzzed" list 106 or "up and coming" list 108 provides a list of "most buzzed" or "up and coming" artists, respectively, associated with only one or more user-specified musical genres.

According to another aspect of the technology, for each artist who appears on "most buzzed" list 106 or "up and coming" list 108, interface 100 is adapted to show certain representative information about the artist in region 112. Region 112 can display a representative photo of the artist, a representative video of the artist, a familiarity ranking assigned to the artist, one or more songs by the artist representative of the artist's talent, or a combination thereof. In certain embodiments, region 112 is linked to or expands into artist information card 200, as shown in FIG. 2, which will be described below in detail.

In another aspect, interface 100 includes advertisement region 110 that is configured to provide targeted advertisements based on content displayed in interface 100. Advertisement region 110 can present advertisement related to one or more artists on "most buzzed" list 106 or "up and coming" list 108. Advertisement region 110 can also present advertisement related to user input terms entered via field 102 so that advertisements are tailored to a user's interest. Exemplary advertisements can be on latest music tours, recent album releases or fashion attires popular among artists who are presented in interface 100.

In some embodiments, artist discovery interface 100 can include a radio-playing element (not shown) configured to play music by at least one artist on "most buzzed" list 106 or "up and coming" list 108. In some embodiments, based on an artist identified on either of the lists, the radio-playing element can play music by other artists who are similar or dissimilar in musical style as the identified artist.

FIGS. 2A-F illustrates various embodiments of an artist information card 200 according to one aspect of the technology. In general, artist information card 200 is configured to present information about a particular artist collected from a plurality of media sources such as from a library, an online source, or a third-party database that contain multimedia content such as videos, music tracks, photos or metadata. In certain embodiments, the library is located on a web server in electronic communication with a user device from which card 200 is displayed. In certain embodiments, the web server includes processing modules to control the operation of card 200. In certain embodiments, the web server collects information about a particular artist from third-party databases and websites for presentation via card 200. Further details regarding network environment of the present technology is discussed below with reference to FIG. 5.

As shown in FIGS. 2A-F, artist information card 200 can include an "audio" tab 206 displaying a music play region, a "videos" tab 202 displaying a video display region, a "photos" tab 204 displaying a photo display region, a "tweets" tab 212 displaying a region, a "news" tab 210 displaying a news region, and a "bio" tab 208 displaying a biography region.

Figure 2A:
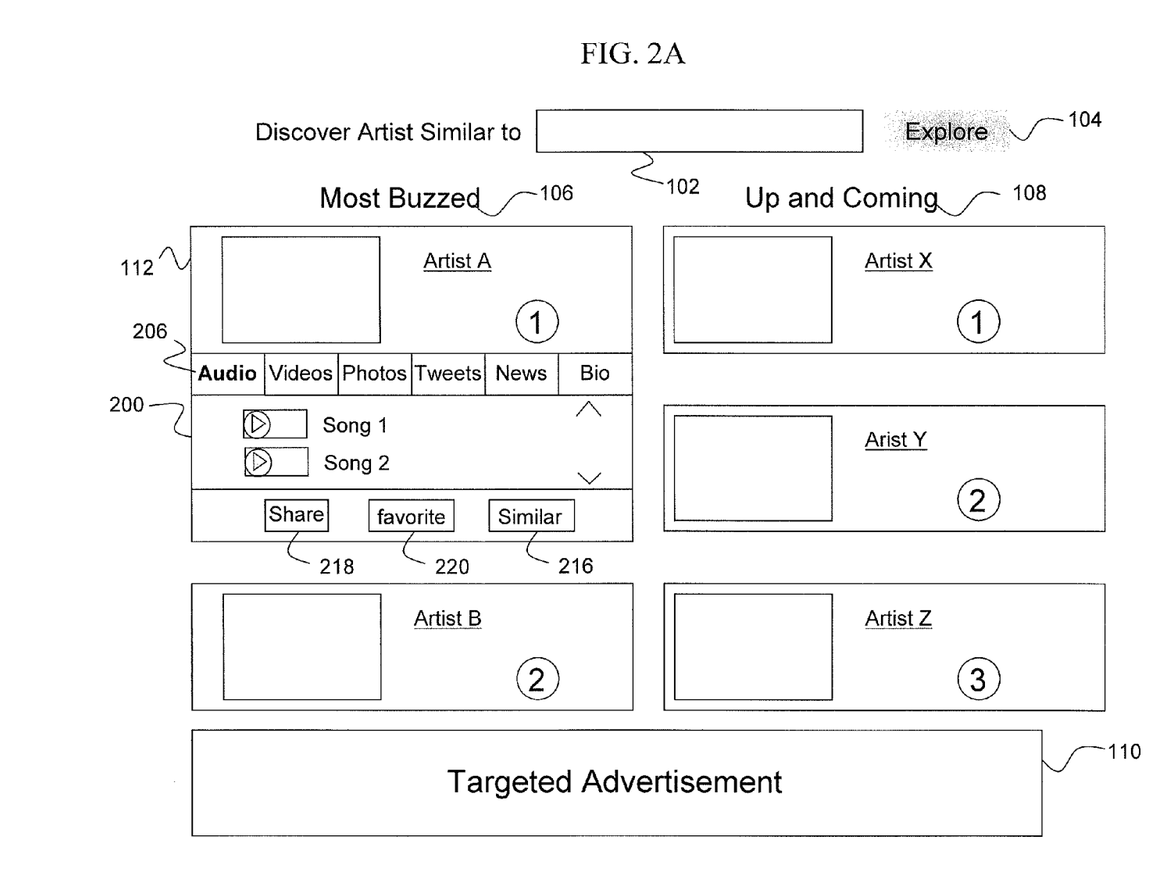
FIGS. 2A-F show diagrams of an exemplary artist information card.

As shown in FIG. 2A, artist information card 200 includes music play region 206 that allows a user to play select tracks by the artist featured in the region 112. Card 200 is adapted to retrieve the tracks from databases located on one or more web servers in communication with card 200 or from tracks posted online. The databases may be internal databases or third-party databases owned by music content providers such as Rhapsody™. Card 200 can select for presentation those tracks by the artist that are most representative of the artist's musical talent, most requested, most popular, or by any other selection criterion. Similarly, card 200 can order the tracks by their release date, their popularity, the number of times each track has been played via card 200, or by any other ordering criterion. Music play region 206 is configured such that a user can browse titles of all available tracks associated with the artist before selecting the one he or she wants to play. In some embodiments, the music play region 206 can play music by other artists who have similar or dissimilar musical style as the featured artist.

Figure 2B:
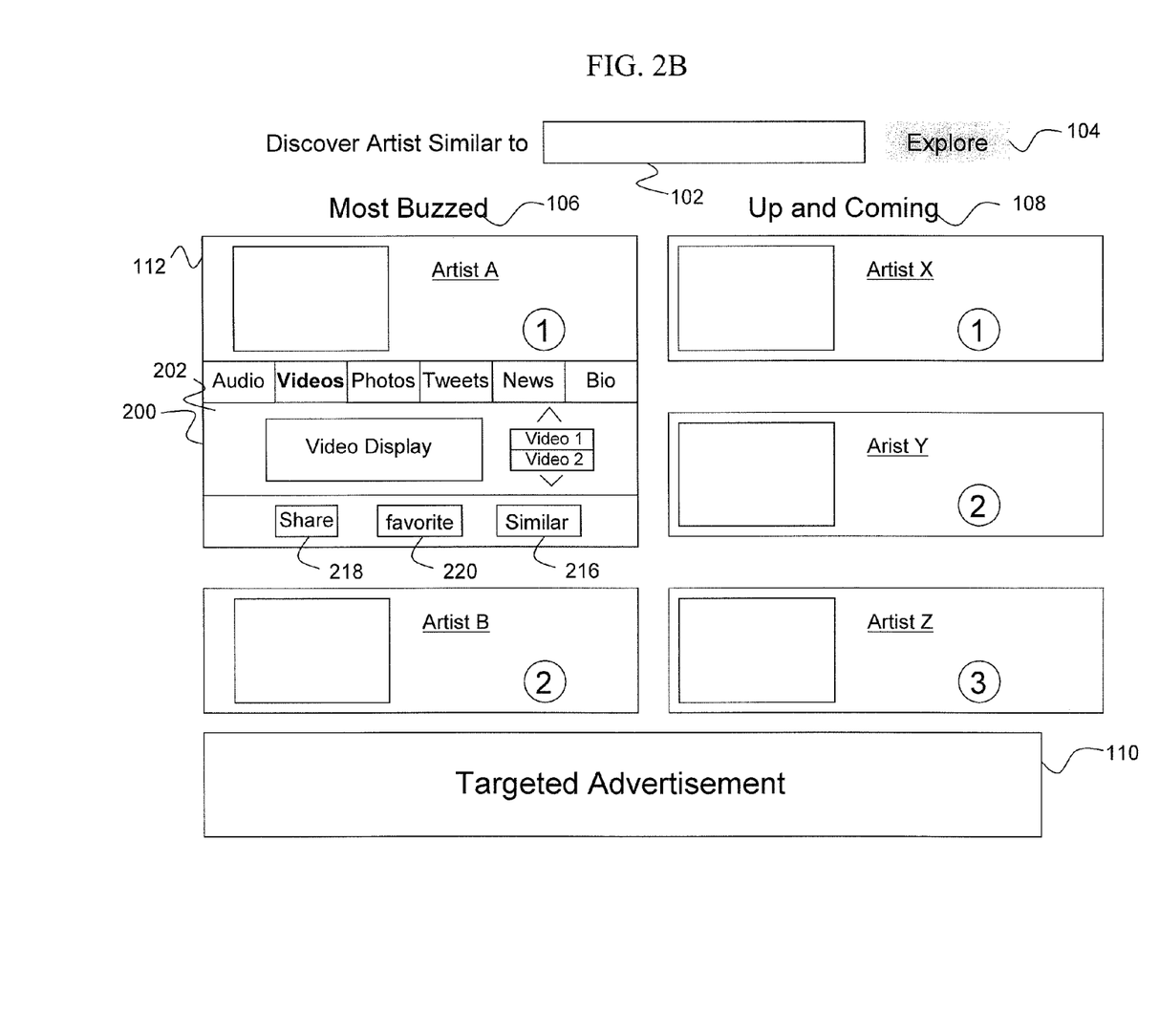

As shown in FIG. 2B, artist information card 200 can include video display region 202 that allows a user to play videos about the artist featured in region 112. Card 200 is adapted to retrieve the videos from databases located on one or more web servers in communication with card 200 or from videos posted online. Exemplary videos include music videos featuring the artist, interview videos with the artist, or third-party videos discussing the artist. Video display region 202 is configured such that a user can browse all the available videos about the artist before selecting the one he or she wants to view.

Figure 2C:
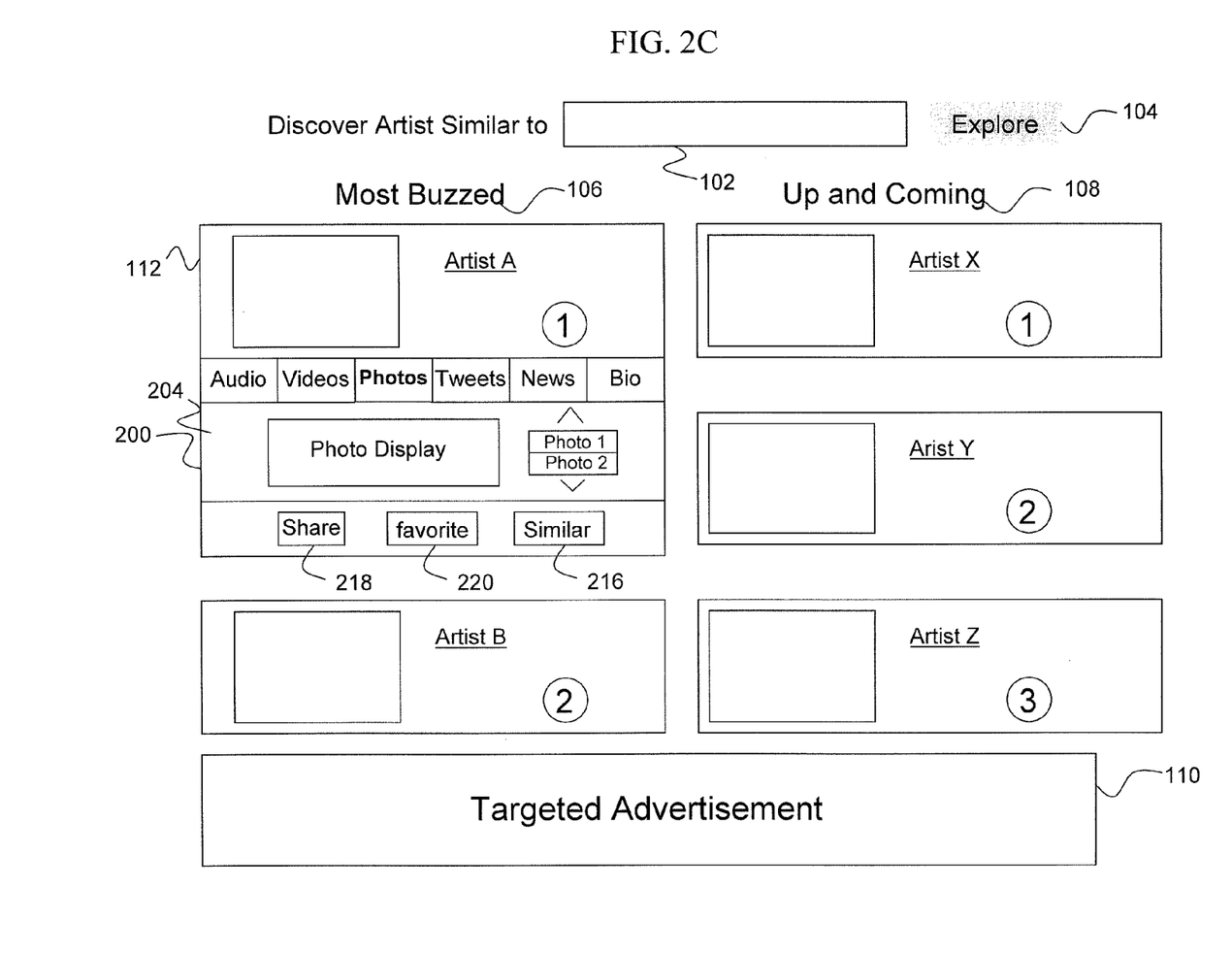

As shown in FIG. 2C, artist information card 200 can include photo display region 204 that allows a user to view photos of the featured artist. Card 200 is adapted to retrieve the photos from databases located on one or more web servers in communication with card 200 or from photos posted online. Photo display region 204 can be configured such that a user can browse thumbnail images of all available photos associated with the artist before selecting the one he or she wants to view in a larger size or better resolution.

Figure 2D:
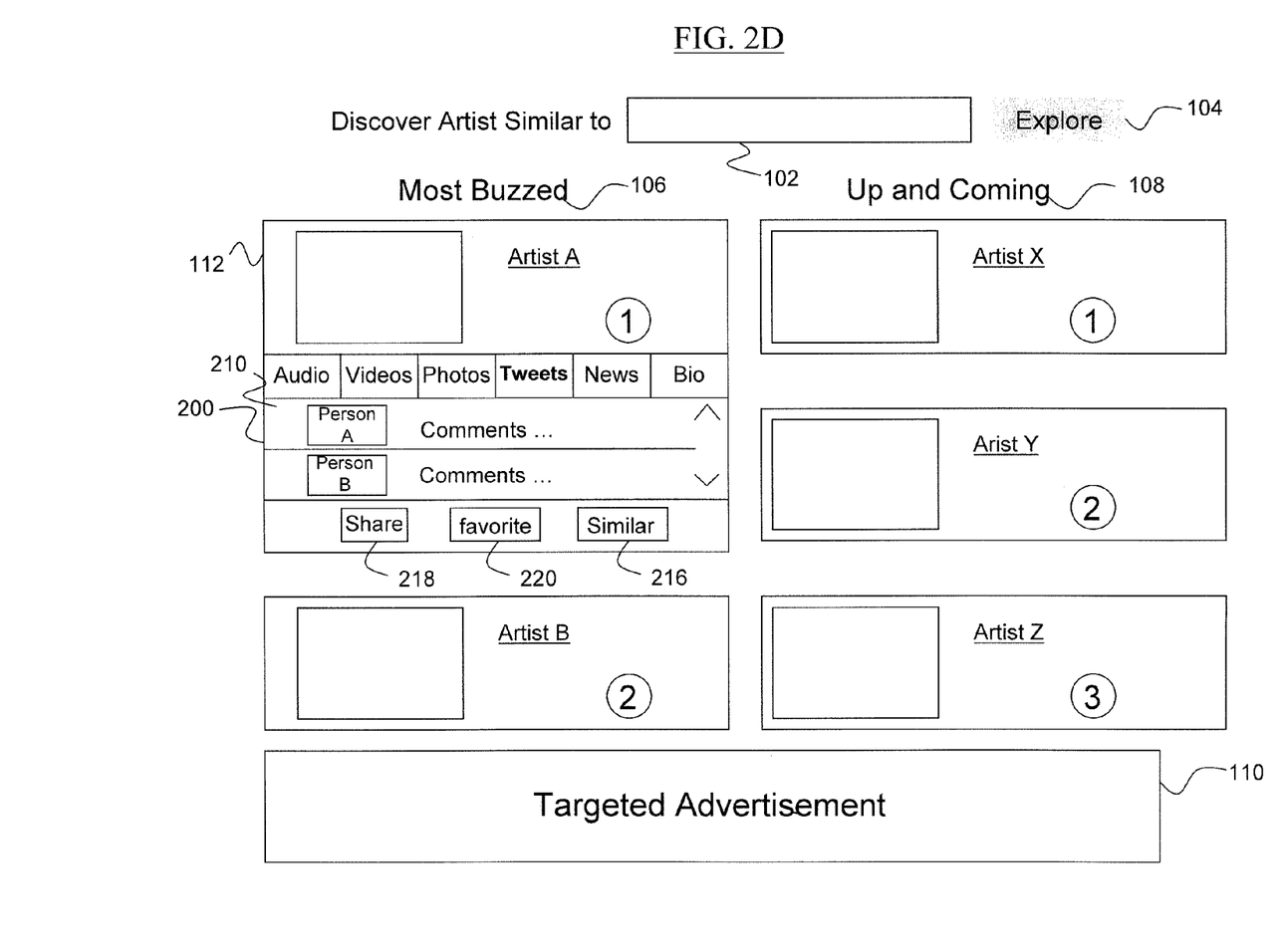

As shown in FIG. 2D, artist information card 200 can further include region 210 for displaying latest postings about the artist supplied by the artist himself or by a third party. Such information can be obtained from twitter pages, blogs, facebook pages, myspace pages, chatrooms, or other social networking websites. Content in region 210 is updated in real-time or in near real-time. In certain instances, the artist himself can directly post to region 210 to provide tour dates, concert locations, greetings to the fans, etc. In certain instances, a user can post comments about the artist to region 210. Information posted in region 210 can be sorted in chronological order as it first appears or in accordance with the reliability of the sources from which the information is collected.

Figure 2E:
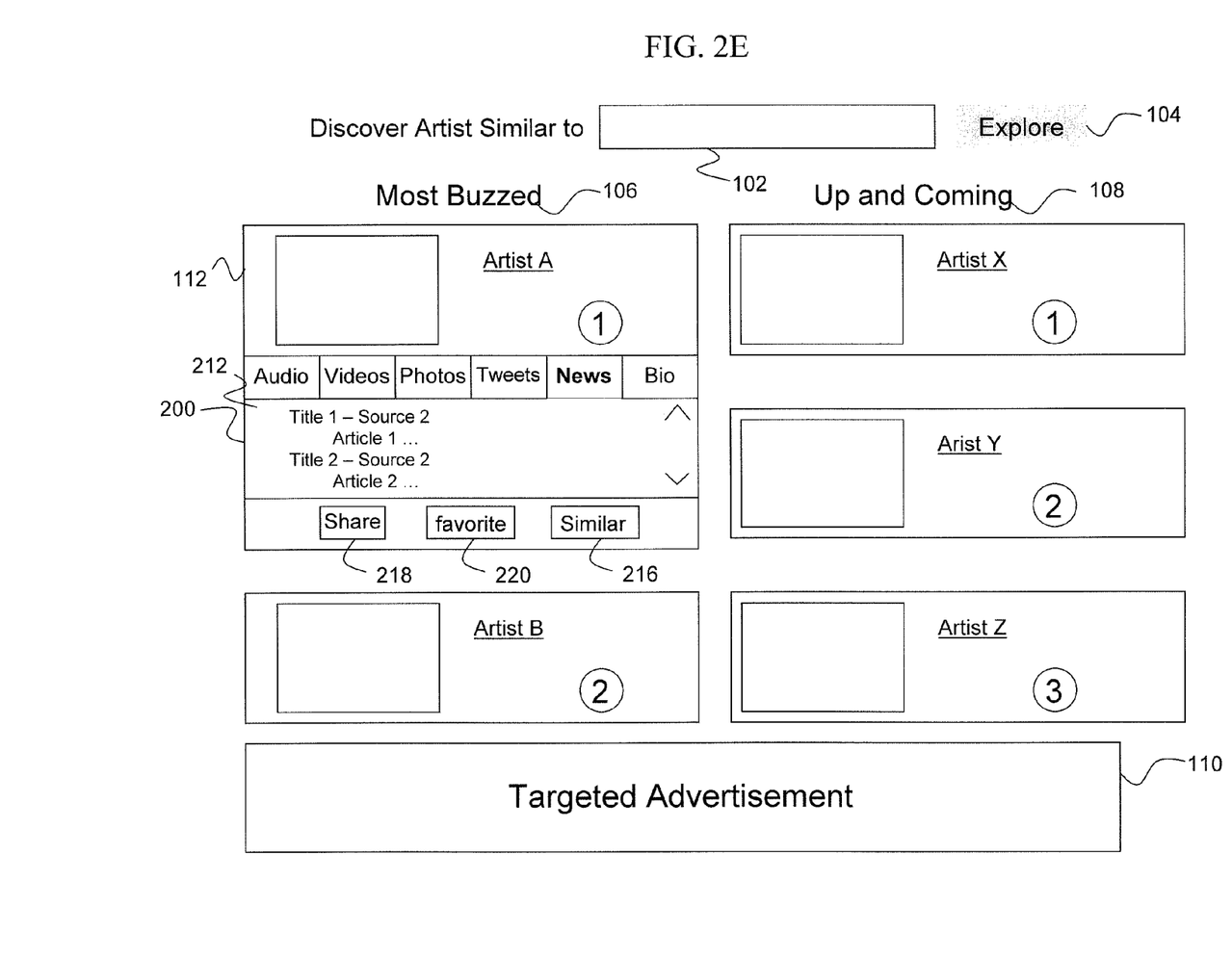

As shown in FIG. 2E, artist information card 200 can include news region 212 for providing latest news published on the artist. Such information can be obtained from a magazine site or a database owned by a news reporting agency, for example.

Figure 2F:
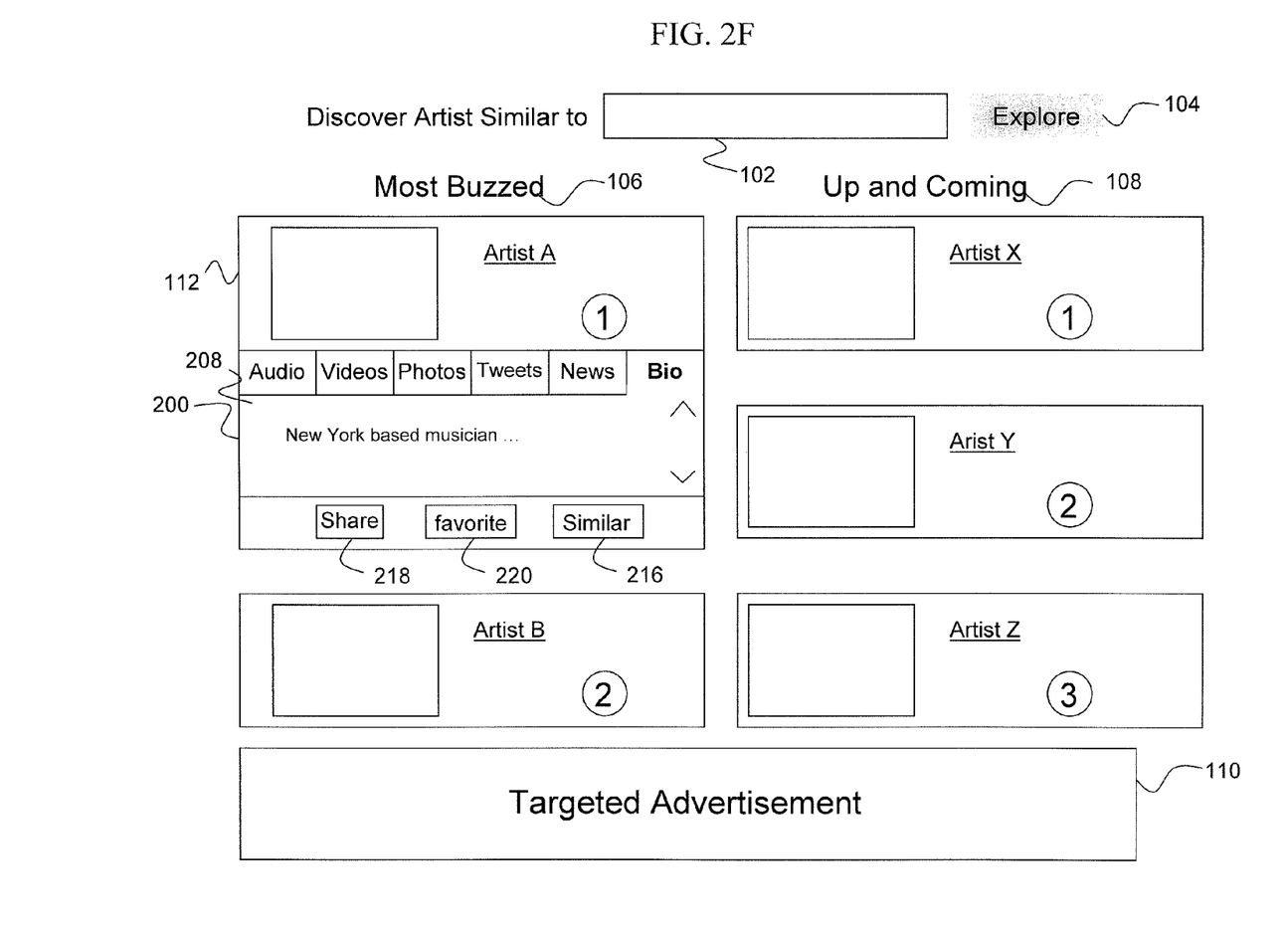

As shown in FIG. 2F, artist information card 200 can also include an artist biography region 208 for displaying biographical information about the featured artist. Card 200 is adapted to retrieve the biographical information from databases located on one or more web servers in communication with card 200 or from online sources such as Wikipedia, gossip websites and news websites or from music data services such as the Rovi Corporation. In certain instances, the information presented about the artist can be sorted according to the reliability of the sources from which the information is collected. For instance, information gathered about the artist from personal interviews, artist blogs, or trusted sites such as Wikipedia can be more prominently displayed than information collected about the artist from a gossip website.

In some embodiments, the artist information card 200 includes a "share" option 218 that allows a user to send card 200 to another via email. "Share" option 218 can also allow the user to embed artist information card 200 into a third-party website as a web widget, i.e., a stand-alone application. This effectively allows the user to turn artist information card 200 into a dynamic web application sharable on one or more third-party websites. For example, upon clicking "share" option 218, a user is presented with a list of third party websites such as Facebook, Twitter, etc. The user can then select one of the websites, such as Facebook, to embed the artist information card 200 so that it appears on his Facebook profile.

Figure 4:
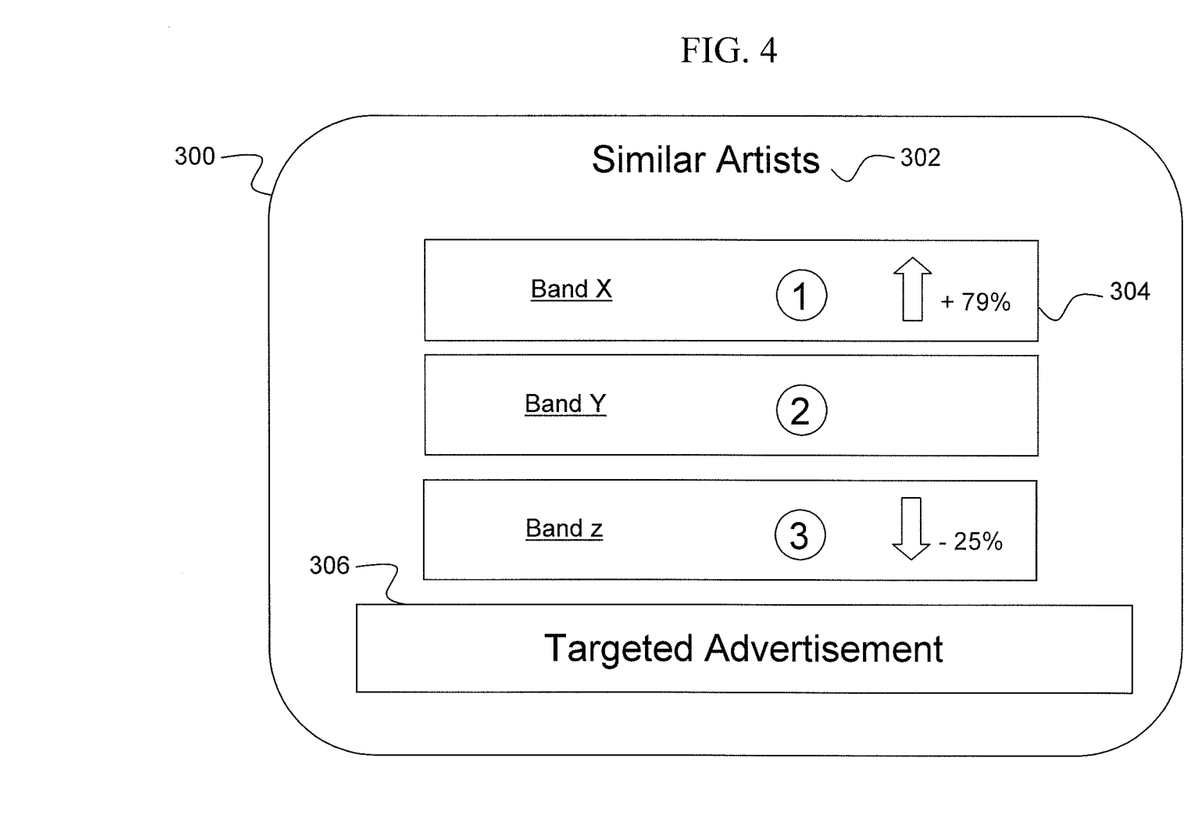
FIG. 4 shows a diagram of an exemplary similarity interface.

In some embodiments, artist information card 200 can generate a list of artists who have similar musical qualities as the artist featured in card 200. A user can access the list by choosing "similar" option 216, for example. An illustrative list of similar artists is shown in FIG. 4 and will be described in detail below. In some embodiments, the artist information card 200 can include a "dissimilar" option (not shown), through which a user can access a list of artists who have dissimilar musical qualities as the featured artist.

In some embodiments, artist information card 200 includes a "favorite" option 220. Upon a user selecting "favorite" option 220, the artist featured in the card 200 is saved in a list of favorite artists associated with the user. In addition, the user can retrieve card 200 at any point in time by choosing the artist from his "favorite" list.

Figure 3:
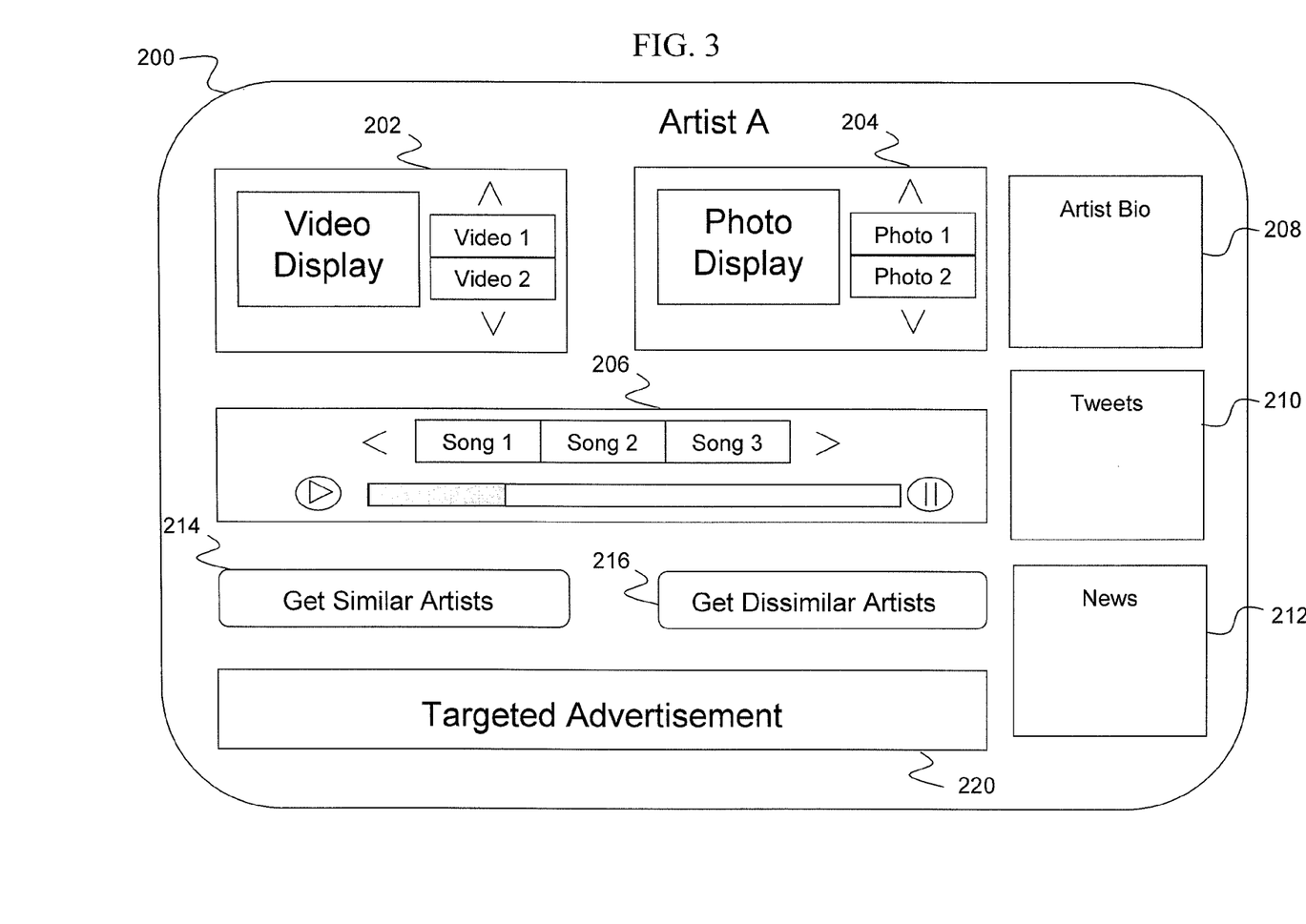
FIG. 3 shows a diagram of another exemplary artist information card.

FIG. 3 shows another embodiment of artist information card 200. As illustrated, card 200 can include, in one display, the music play region 206, the video display region 202, the photo display region 204, the region 212, the news region 210 and the biography region 208.

In some embodiments, artist information card 200 includes an advertisement region 220 adapted to provide customized advertisement based on the content displayed in card 200. For example, advertisement region 220 can present advertisement about the artist's latest tour or upcoming album or singles releases. Advertisement region 220 can advertise albums or tracks that share similar musical qualities as the featured artist. Advertisement region 220 can also advertise goods or services the artist has talked about recently or products that have appeared with the artist. For example, advertisement region 220 can advertise clothes worn by the artist in a photo displayed in region 204.

Artist information card 200 can be accessed from a variety of sources. In some embodiments, a user can access artist information card 200 from interface 100 via region 112 that is associated with either "most buzzed" list 106 or "up and coming" list 108. For example, as shown in FIGS. 2A-F, region 112 can be expanded into an artist information card 200. In some embodiments, a user can access artist information card 200 directly from interface 100 by entering information about a particular artist via field 102 of interface 100. In some embodiments, the artist information card 200 can be made available via a third-party website or found from an online search or link.

For example, artist information card 200 can be implemented as a hover box, which is a Graphic User Interface (GUI) event that can be triggered when a user moves or hovers his cursor over a particular area of the GUI, such as over the name of an artist who appears on "most buzzed" list 106 or "up and coming" list 108 in artist discovery interface 100 or over a name mentioned in a third-party GUI. Artist information displayed in a hover box can be a portion of the information displayed in artist information card 200 or the entire content of artist information card 200.

As another example, a user can embed artist information card 200 in a third-party web interface by using, for example, "share" option 218 as described above. Exemplary embeddable interfaces include blog postings, facebook entries, myspace pages, etc.

FIG. 4 provides an exemplary interface 300 displaying a "similarity" list 302. In one embodiment, "similarity" list 302 presents those artists who share similar musical qualities as an artist featured in artist information card 200. In another embodiment, "similarity" list 302 presents those artists who possess musical qualities similar to those captured by terms supplied by a user via field 102 of interface 100.

Interface 300 can generate "similarity" list 302 by first conducting a search for similar artists in one or more libraries in communication with interface 300. In certain embodiments, the libraries are located on a web server in electronic communication with a user device from which interface 300 is displayed. In certain embodiments, the web server includes processing modules to control the operation of interface 300. Further details regarding network environment of the present technology is discussed below with reference to FIG. 5.

Interface 300 is configured to assign a similarity score to each artist searched that reflects the degree of similarity between the artist and the searched term. A similarity score can be computed based on similarities in musical genre, tempo, rhythm, beats, melody, pitch, harmony, timbre or a combination thereof. A similarity score can also be computed using the systems and methods described in application Ser. Nos. 12/101,013 and 12/100,966. "Similarity" list 302 is adapted to present those artists whose similarity scores are above a select threshold. Interface 300 can order the artists who appear on "similarity" list 302 according to their similarity scores, with the artist having the highest score highest on the list and the artist with the lowest score lowest on the list, for example.

For each artist who appears on "similarity" list 302, interface 300 is adapted to show certain representative information about the artist in region 304. For instance, region 304 can display a representative photo of the artist, a representative video of the artist, a similarity ranking assigned to the artist, one or more songs by the artist or a combination thereof. In certain instances, region 304 can indicate how much an artist's similarity score has changed in comparison to an earlier time. The change can be represented as a percentage change or as a whole number indicating a change in position on list 304. In certain instances, region 304 is linked to or expandable into artist information card 200, described above with reference to FIG. 2. Hence, a user can drill down on each artist presented on "similarity" list 304.

According to another aspect of the technology, interface 300 can generate a list of artists who share dissimilar musical qualities as an artist featured in artist information card 200. In another embodiment, interface 300 can generate a list of dissimilar artists based on an input term supplied by a user via field 102 of interface 100.

In one example, a "dissimilarity" list includes those artists whose similarity scores are below a select threshold. In another example, a "dissimilarity" list includes those artists whose dissimilarity scores are above a select threshold.

According to yet another aspect of the technology, interface 300 includes a targeted advertisement region 306 for presenting advertisements customized based on the content displayed in interface 300. Advertisement region 306 can advertise goods or services related to at least one artist on list 304. Advertisement region 306 can also advertise goods or services related to a common feature among all the artists. For example, advertisement region 306 can advertise an album by an artist who is not on the list, but is in the same musical genre as the artists listed.

In some embodiments, interface 300 can include a radio-playing element (not shown) configured to play music by at least one artist on "similarity" list 302. In some embodiments, the radio-playing element can play music by at least one artist on a "dissimilarity" list (not shown) generated by the interface 300.

Figure 5:
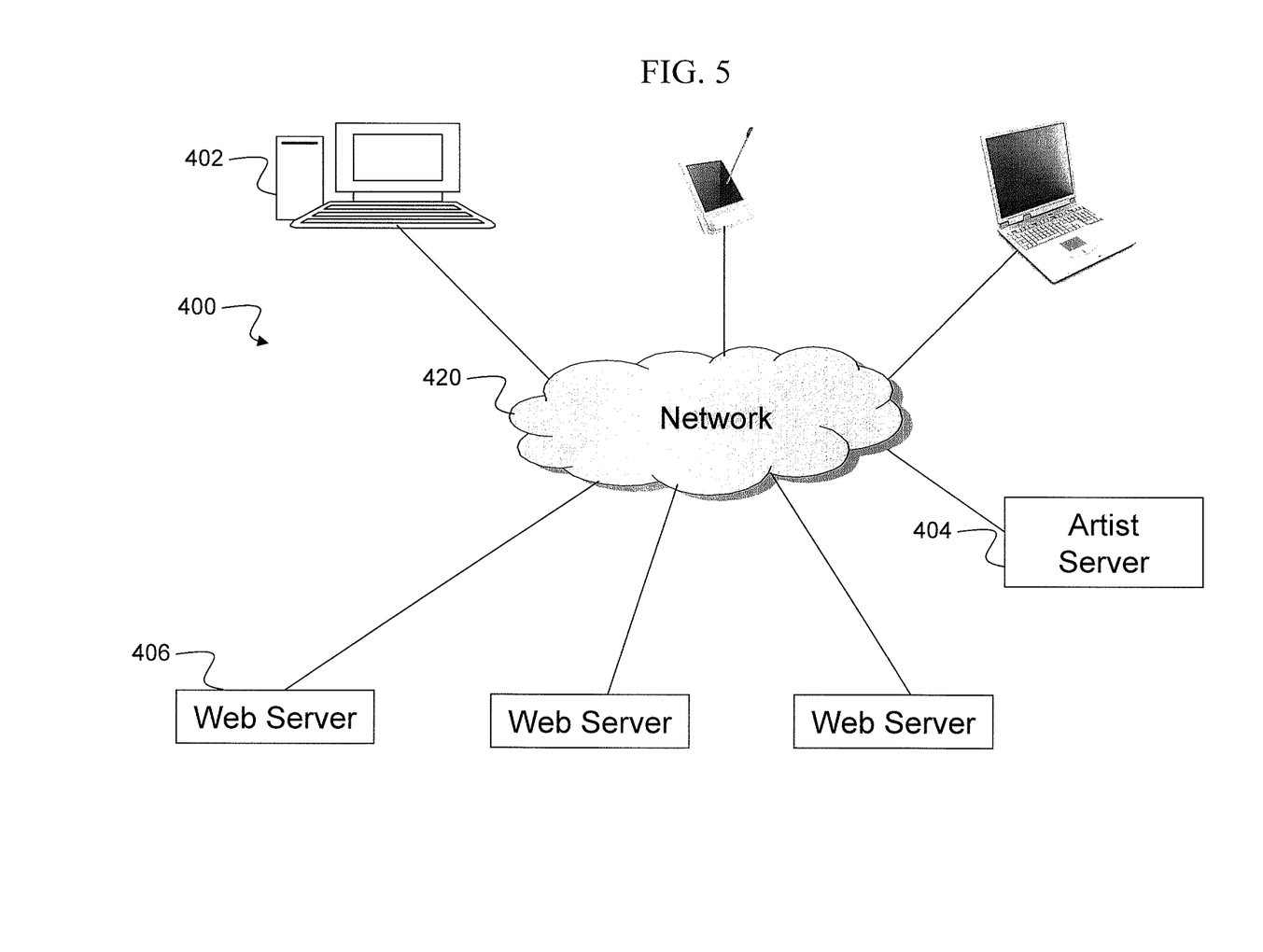
FIG. 5 shows a diagram of an exemplary network environment.

FIG. 5 provides an exemplary network environment 400. Network environment 400 includes one or more clients 402, an artist server 404 and a plurality of web servers 406. Each of clients 402, artist server 404 and web servers 406 is in mutual communication with network 420.

Each of clients 402 can be a computing device operated by a user. A computing device as used herein refers to any device with a processor and memory that can execute instructions. Computing devices include, but are not limited to, personal computers, server computers, portable computers, laptop computers, personal players, personal digital assistants (PDAs), cellular telephones, e-mail clients, tablets, Internet Protocol televisions (IPTV) and game consoles. These computing devices can run one or more application programs and an operating system. Each client 402 can include a wired or wireless interface to network 420. In certain embodiments, clients 402 are configured to display interfaces 100, 200 or 300 to users of the artist discovery system as well as allow the users to interface with the system. In general, interfaces 100, 200 and 300 are platform independent and can run on a variety of computing platforms.

Artist server 404 can include one or more libraries or storage modules for storing metadata, photos, musical tracks and videos associated with a plurality of artists. Metadata can take the form of parameters, lists or other data structures. Metadata can include numerical, text, pictorial and other information about an artist. Photos can be in form of TIF, PNG, JPG, GIF or any other photo file format. Musical tracks can be in the form of MP3, MIDI, WAV, WMA, or any other audio file format. Videos can be in the form of AVI, MPEG, FIV or any other video file format.

Artist server 404 can also include processing modules to control the operation of interfaces 100, 200 and 300. Artist server 404 can further include one or more search engines to enable efficient searches of the information stored in the libraries or storage modules. Searches can be conducted by artist names, album titles, track titles, or other musical characteristics.

In certain embodiments, artist server 404 is configured to access the internet via network 420 to search for pertinent artist information. In certain embodiments, artist server 404 communicates with a plurality of external web servers 406 via network 420. These web servers can host third-party music content, photo content, video content or metadata about artists. In certain instances, artist server 404 includes algorithms designed to conduct targeted queries of information in servers 406 as well as on the internet.

In certain embodiments, library server 404 is adapted to search its libraries and storage modules for artist-related information and supply such information to interfaces 100, 200 and 300 for display. In certain embodiments, library server 404 queries third-party servers 406 for artist-related information for presentation via interfaces 100, 200 and 300. In certain embodiments, library server 404 searches online content for artist information. In certain embodiments, library server 404 updates its own database with information obtained from external servers or from the internet.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A musician discovery system comprising:
a computing device configured to display user interfaces to a user;
a first interface displayed by the computing device for displaying a plurality of first musicians organized according to a musical characteristic, the first musicians being determined by an external media source in response to a query from the user, each of the first musicians being determined when a respective first computed score is above a first threshold value;
a plurality of separated regions arranged within the first interface each of which is dedicated to one of the first musicians, wherein, upon selection of a first separated region corresponding to a first one of the first musicians, the first separated region expands to present first multimedia information about the first musician, the expanded first separated region displacing an adjacent separated region corresponding to a further one of the first musicians;
a selectable region displayed within the expanded first separated region, the selectable region, when selected by the user, causing the computing device to access the external media source to retrieve a plurality of second musicians, the first computed score for each of the second musicians being below the first threshold value, and the computing device comparing multimedia information associated with the second musicians with the first multimedia information presented on the expanded separated region about the first one of the first musicians to generate a second computed score; and
a second interface displayed by the computing device recommending a selected one of the second musicians when the second computed score is above a second threshold value.

2. The discovery system of claim 1, further comprising means for selecting the first musicians based on an input by the user.

3. The discovery system of claim 2, wherein the input comprises a musician name or a musical genre.

4. The discovery system of claim 1, wherein the first musicians are ranked according to the musical characteristic.

5. The discovery system of claim 4, wherein the musical characteristic comprises a popularity score and the first interface ranks the plurality of musicians according to their corresponding popularity scores.

6. The discovery system of claim 5, wherein the popularity score is weighted according to a genre type associated with each musician.

7. The discovery system of claim 1, wherein the first multimedia information includes at least one of biography, song, photo, blog, video or tweet associated with the first musician.

8. The discovery system of claim 1, wherein the second interface performs a comparison of the first multimedia information corresponding to the first one of the first musicians with second multimedia information corresponding to the selected one of the second musicians and recommends the selected one of the second musicians based on a feature of musical similarity or dissimilarity between the first one of the first musicians and the selected one of the second musicians.

9. The discovery system of claim 8, wherein the comparison of the first multimedia information with the second multimedia information is based on similarities in at least one of musical tempo, rhythm, beats, melody, pitch, harmony, or timbre.

10. The discovery system of claim 8, wherein the comparison of the first multimedia information with the second multimedia information is based on a frequency of both the first and second musicians being mentioned together in one of blogs, news articles, or social media comments.

11. The discovery system of claim 1, wherein the second interface is further adapted to display a plurality of third musicians from a library database on the external media source, the third musicians sharing a feature of musical similarity or dissimilarity with the first one of the first musicians.

12. The discovery system of claim 11, wherein the second interface ranks the third musicians according to their degrees of similarity or dissimilarity with the first musician.

13. The discovery system of claim 1, further comprising a third interface for providing advertisement related to the first musicians.

14. The discovery system of claim 1, further comprising a library database on the external media source for storing the first multimedia information corresponding to the first musicians and the second musicians, wherein the library database is in communication with at least one of a music database, a website, a photo database, a search engine or a video database.

15. The discovery system of claim 1, wherein the first computed score is a popularity score and the second computed score is a similarity score.

16. A computer-assisted method for discovering musicians, the method comprising:
selecting a plurality of first musicians from a library database in response to a query from a user, each of the first musicians being determined when a first computed score is above a first threshold value;
organizing the first musicians according to at least one musical characteristic along a plurality of separated regions arranged within a first interface, each of the separated regions being dedicated to one of the first musicians;
permitting the user to select a first one of the first musicians by selecting a first separated region corresponding to the first one of the first musicians;
upon selection of the first separated region by the user, expanding the first separated region to present first multimedia information about the first one of the first musicians to the user collected from a plurality of external media sources in communication with the library database, wherein the expanded first separated region displaces an adjacent separated region corresponding to a further one of the first musicians;

comparing multimedia information associated with a plurality of second musicians from the library database with the first multimedia information associated with the first one of the first musicians to determine their similarity with the first musician to generate a second computed score, the first computed score for each of the second musicians being below the first threshold value; and recommending a selected one of the second musicians to the user when the second computed score is above a second threshold value.

17. The method of claim 16, wherein the plurality of media sources include music databases, websites, photo databases, search engines and video databases.

18. The method of claim 16, wherein the first computed score comprises a popularity score and the plurality of musicians are ranked according to their corresponding popularity scores.

19. The method of claim 18, further comprising displaying one or more musicians from the second musicians whose popularity scores are below the first threshold value and above a third threshold value.

20. The method claim 16, further comprising assigning the second computed score to each of the second musicians, the second computed score being a similarity score.

21. The method of claim 20, further comprising assigning a third computed score to each of the second musicians, the third computed score being a dissimilarity score, wherein the second musician has a dissimilarity score greater than a third threshold value.

22. A computer-assisted method for discovering musicians, the method comprising:

selecting a first plurality of musicians from a library database in response to a query from a user based upon popularity scores assigned to each of the first plurality of musicians;

ranking the first plurality of musicians according to the popularity scores;

displaying one or more musicians from the first plurality of musicians in a respective separated region in a first interface, the one or more displayed musicians having popularity scores above a first threshold value;

receiving a selection from the user selecting a first musician in a first separated region from the one or more displayed musicians;

expanding the first separated region to present multimedia information about the first musician to the user, the multimedia information collected from a plurality of external media sources in communication with the library database, the expanded first separated region displacing an adjacent separated region corresponding to a further one of the first musicians; receiving a further selection from the user from a selectable region displayed within the expanded first separated region;

comparing a second plurality of musicians from the library database with the first musician to determine their similarity or dissimilarity with the first musician, each of the second plurality of musicians having popularity scores below the first threshold value, the comparison generating one of a similarity score and a dissimilarity score; and recommending a second musician from the second plurality of musicians to the user on a second interface, when one of the similarity score is above a similarity threshold value and when the dissimilarity score is above a dissimilarity threshold value.

* * * * *